US005762154A

United States Patent [19]

Hsu

[11] Patent Number: 5,762,154

[45] Date of Patent: Jun. 9, 1998

[54] ELECTRICAL DRIVING SYSTEM FOR A WHEEL CHAIR

[76] Inventor: Jong-Yes Hsu, No. 31, Lane 32, Chiang Nan 10th St., Ta Yuan Shih, Tao Yuan Hisen, Taiwan

[21] Appl. No.: 606,731

[22] Filed: Feb. 27, 1996

[51] Int. Cl.[6] .................... B62D 15/00

[52] U.S. Cl. .................... 180/15; 180/907; 280/304.1

[58] Field of Search .................... 180/11, 15, 907; 280/250.1, 304.1

[56] References Cited

U.S. PATENT DOCUMENTS 2,993,550 7/1961 Klappert .................... 180/15

5,291,959 3/1994 Malblanc .................... 180/11

*Primary Examiner*—Donald W. Underwood

*Attorney, Agent, or Firm*—Morton J. Rosenberg; David I. Klein; Jun Y. Lee

[57] ABSTRACT

An electrical driving system which may be conveniently installed on or removed from a wheelchair is provided. The electrical driving system comprises a coupling assembly which houses a storage battery and a control circuit board. The system also comprises a holder assembly which houses motors and planetary gears which drive a pair of drive wheels. The electrical driving system is installed on the wheelchair by coupling together an upper connector and a lower connector of the coupling assembly about each of the tipping levers of the wheelchair. The coupling assembly includes a plurality of coupling pins, finger elements, and set pins, the appropriate coupling of which enables each finger element to be pivotally displaced to selectively press or release an upper connector to correspondingly grip or release the given tipping lever captured between that upper connector and a lower connector. A control column is secured to an armrest of the wheelchair, and a control circuit board is couple thereto for selectively actuating the drive motors responsive to control column manipulation by the wheelchair's user.

1 Claim, 5 Drawing Sheets

ELECTRICAL DRIVING SYSTEM FOR A WHEEL CHAIR

BACKGROUND OF THE INVENTION

The main object of the present invention is to provide an electrical driving system for a wheelchair which enables a user to control the wheelchair's movement by use of a control column.

SUMMARY OF THE INVENTION

The present invention relates to an electrical driving system for a wheelchair which may be retrofitted to a prior art wheelchair having tipping levers. The system comprises a coupling assembly, a storage battery, a circuit board, and a driving mechanism that includes a holder, two motors, a left drive wheel, and a right drive wheel. The system also comprises a control column.

The coupling assembly houses the storage battery and the circuit board. It includes two upper connectors and two lower connectors. The lower connectors protrude on two ends of the coupling assembly, each having an arcuate recess formed therein. The upper connectors are shaped plates, each also having an arcuate recess formed therein. The holder is connected to the coupling assembly and comprises a hollow cylinder which houses the motors. The left drive wheel is connected to a power transmission shaft of one motor while the right drive wheel is connected to a power transmission shaft of the other motor. The upper connectors and the lower connectors are locked together by means of a plurality of finger elements, set pins, and coupling pins. The connectors grab the tipping levers of the wheelchair therebetween to releasably secure the electrical driving system thereto. The finger elements may be pivoted about the set pins by a user either to force the upper connectors against the tipping levers firmly (and thereby fasten the electrical driving system coupling assembly to the wheelchair) or to release the upper plate to allow the coupling assembly's removal from the wheelchair's tipping levers.

The control column is secured to an armrest of the wheelchair and is coupled to the circuit board, such than a user may conveniently control the electrical driving system installed on the wheelchair. In addition, springs are provided and fitted between the coupling assembly and the holder to resiliently bias the holder and the drive wheels coupled thereto against the underlying surface when the electrical driving system is installed on the wheelchair.

BRIEF DESCRIPTION OF THE DRAWINGS

The invention will be better understood by reference to the accompanying drawings, wherein.

DESCRIPTION OF THE PREFERRED EMBODIMENTS

Figure 1:
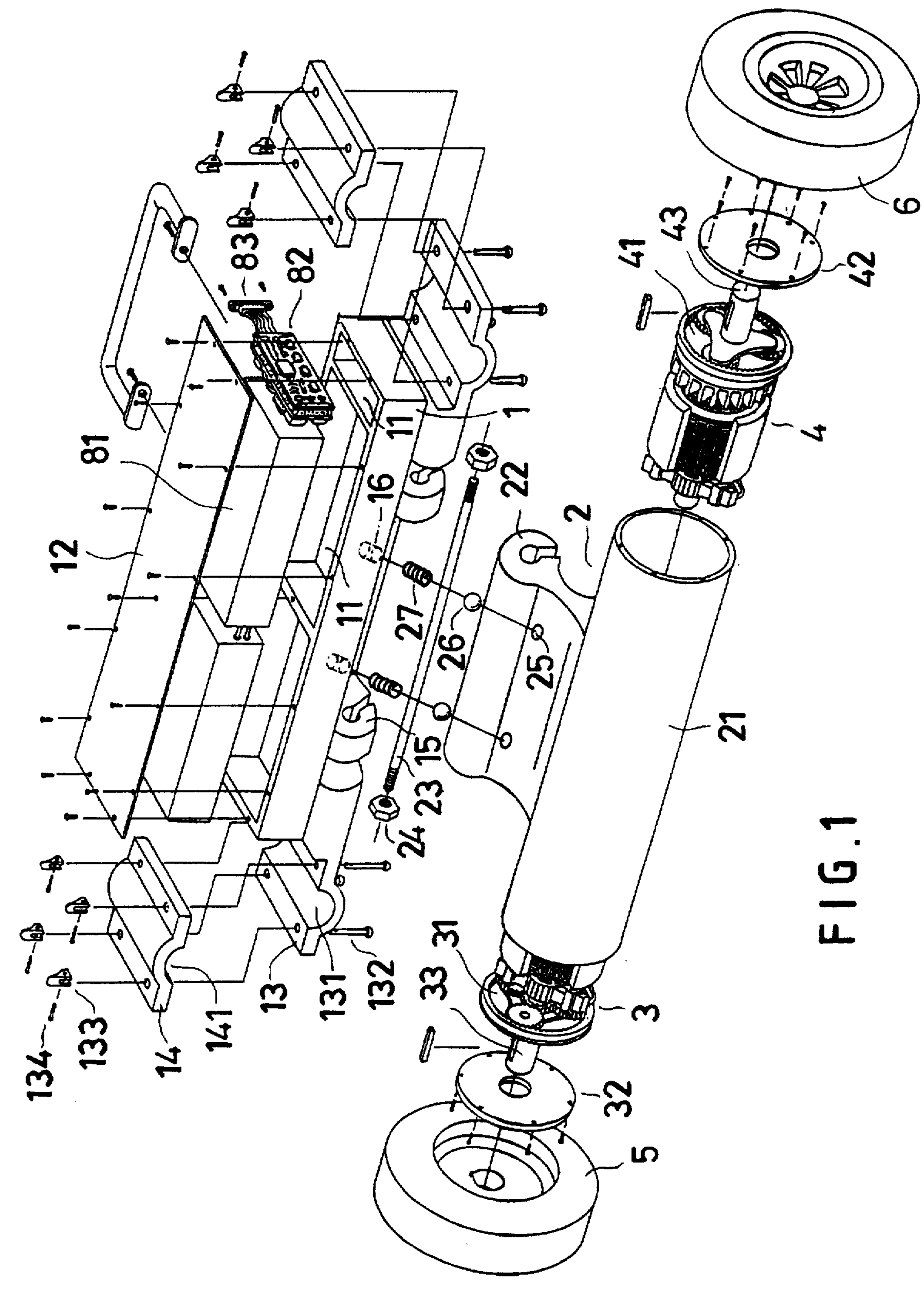
FIG. 1 is an exploded perspective view of a preferred embodiment of the present invention.
Figure 2:
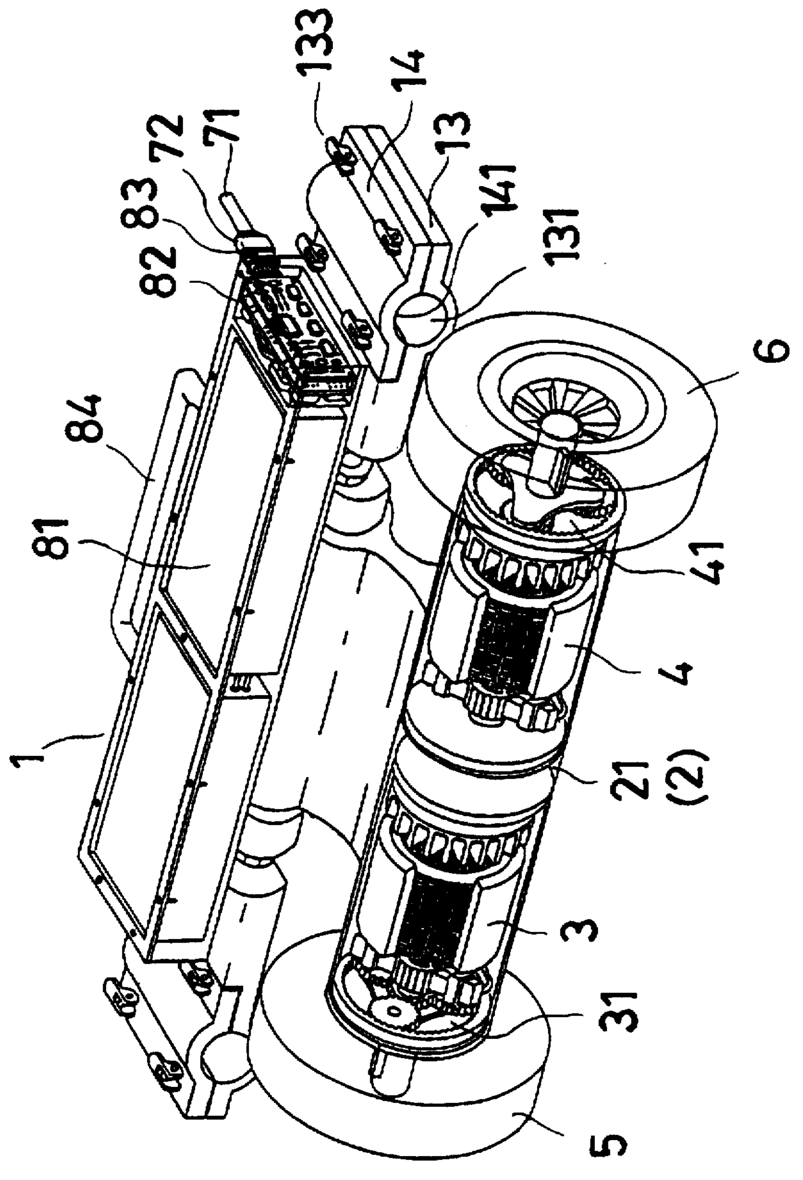
FIG. 2 is an exploded perspective view showing a part of the assembled electrical driving system of FIG. 1.
Figure 5:
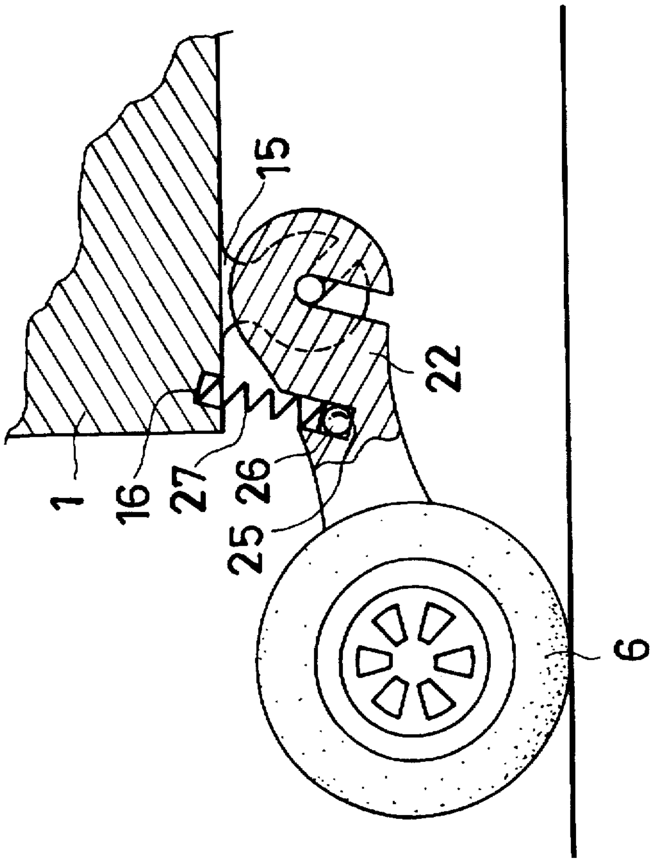
FIG. 5 is a sectional view, partially cut away, of the electrical driving system of FIG. 2 showing a spring and a bead fitted between the coupling assembly and the holder.
Figure 6:
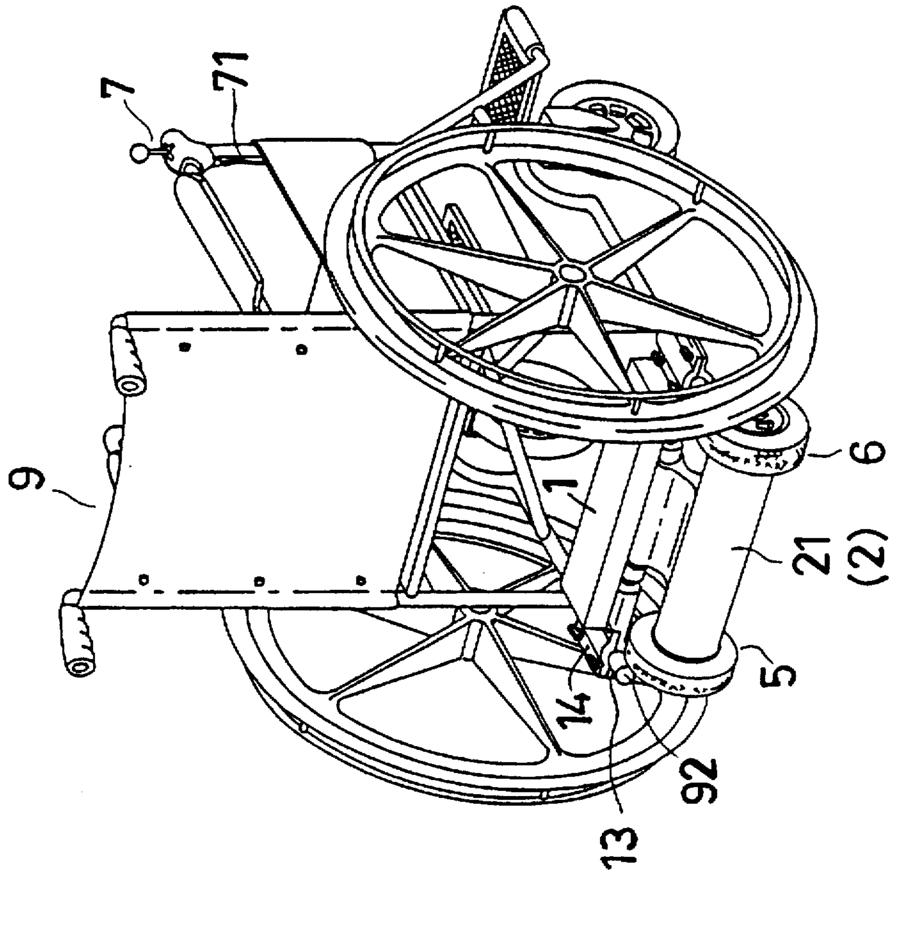
FIG. 6 is a perspective view showing the preferred embodiment of the present invention shown in FIG. 2 installed on a wheelchair; and, FIG. 7 is a perspective view of a prior art wheelchair having two tipping levers.
Figure 7:
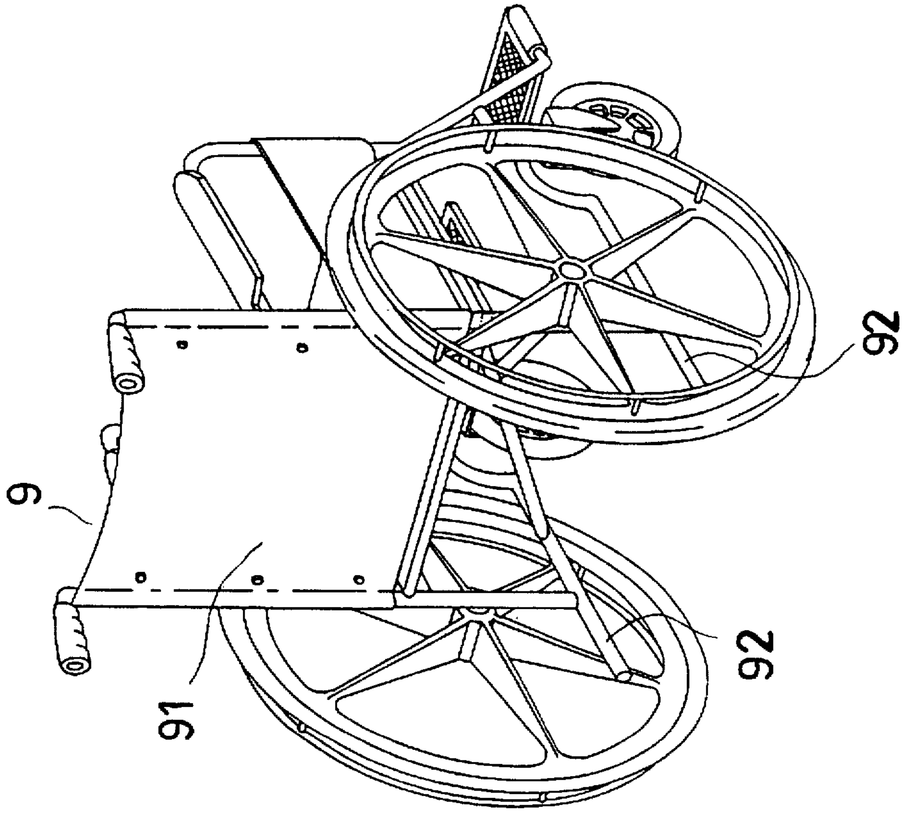
FIG. 7 (PRIOR ART)

There is shown in FIGS. 1, 2 a preferred embodiment of the subject electrical driving system for a wheelchair. The system is secured to two tipping levers 92 of a prior art wheelchair 9 shown in FIG. 6. The system comprises a coupling assembly 1, a storage battery 81, a control circuit board 82, a holder 2, two motors 3, 4, a left drive wheel 5, a right drive wheel 6, and a control column (FIG. 6).

The coupling assembly 1 houses the storage battery 81 and the circuit board 82 in a compartment 11 tightly enclosed by a cover 12. The coupling assembly 1 includes upper connectors 14, two lower connectors 13, two connecting protrusions 15, two springholds 16, and their removing handle 84. The lower connectors 13 protrude from two ends of the main body portion of the coupling assembly 1, each having an arcuate recess 131 formed therein. The upper connectors 14 are shaped plates, each of which also has an arcuate recess 141 formed therein. The removing handle 84 is secured to a front side, while the connecting protrusions 15 are provided on a bottom of the coupling assembly 1, with through openings formed therein.

The holder 2 includes a protrusion 22, two holes 25, and a hollow cylinder 21; the protrusion 22 is shaped cylindrically, having a through opening and a longitudinal slot formed therein. The hollow cylinder 21 houses the motors 3, 4. At a left end thereof is fitted an assembly of planetary gears 331 and a round cover 32, while at a right end thereof an assembly of planetary gears 41 and a round cover 42. The planetary gears 31, 41 are provided to optimally transfer the torque generated by motors 3, 4. The left drive wheel 5 is connected to a power transmission shaft 33 of the motor 3, while the right drive wheel 6 is connected to a power transmission shaft 43 of the motor 4.

To connect the holder 2 to the coupling assembly 1, the through opening of the protrusion 22 is aligned with the through openings of the connecting protrusions 15, and a threaded rod is inserted therethrough. The rod is locked in place by means of two nuts 24 screwed on the two ends of the treaded rod 23.

Beads 26 and springs 27 are inserted into the spring holes 16 of coupling assembly 1 and the holes 25 of the holder 2. Each hole 25 is thus arranged to align and communicate with one of the springholds 16.

Figure 3:
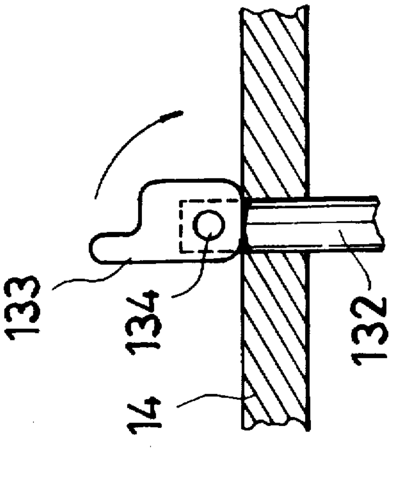
FIG. 3 is a sectional view, partially cut away, showing the position of a finger element at which the electrical driving system of FIG. 2 is removable from the tipping levers of a wheelchair.
Figure 4:
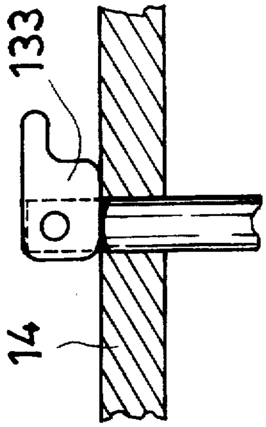
FIG. 4 is a sectional view, partially cut away, showing the position of a finger element at which the electrical driving system of FIG. 2 fastened to the tipping levers of a wheelchair.

The upper connectors 14 and the lower connectors 13, which are connected by means of a plurality of finger elements 133, set pins 134, and coupling pins 132, capture the tipping levers 92 therebetween to secure the electrical driving system in releasable manner to the wheelchair 9. The coupling pins 132 are inserted through opposing openings (not numbered) in upper and lower connectors 14, 13. Each coupling pin 132 has a finger element 133 pivotally coupled thereto by means of a set pin 134. The finger elements 133 may be pivoted about the axes of said pins 134 by the user either the force the upper plate 14 downward against the tipping levers 92, as shown in FIG. 4, to secure the electrical driving system to the wheelchair 9; or to release the upper plate 14, as shown in FIG. 3, so as to allow the coupling assembly 1 to be removed from the wheelchair 9.

The control column 7 is fitted to an armrest 71 of the wheelchair 9 and is electrically coupled to the control circuit board 82 by connecting a plug 72 extending via an electrical wire 71 from the control column 7 to a socket 83 extending from the control circuit board 82. The plug may be disconnected from the socket 83 when the user wishes the remove the electrical driving system from the wheelchair 9.

When the coupling assembly 1 is coupled to the holder 2, the drive wheels 5, 6 are resiliently biased by the springs 27 to touch the ground. The user may control the movement of the wheelchair 9 by manipulating the control column 7 and thereby controlling the electrical driving system. The control column 7 may be pushed forward or backward to move the wheelchair 9 correspondingly forward or backward. The control column 7 may be similarly pushed to the left and to the right to turn the wheelchair non-correspondingly left or right. The left drive wheel 5 is caused to rotate faster than the right drive wheel 6 when the control column 7 is pushed to the right, and vice versa.

From the above description, it will be recognized that the electrical driving system for a wheelchair of the present invention may be removed from the wheelchair 9 easily when not needed such that the wheelchair 9 may be collapsed as before to be carried if desired.

While the preferred embodiments of the invention have been described above, it will be recognized and understood that various modifications may be made therein and that the appended Claims are intended to cover all such modification which may fall within the spirit and scope of the invention.

What is claimed is:

1. An electrical driving system for propelling over a support surface a wheelchair having a pair of tipping levers comprising:

(a) a coupling assembly including:
  (1) a main body portion;
  (2) at least a pair of upper and lower connector members coupled to said main body portion, said upper and lower connector members being adapted to capture therebetween at least one of said wheelchair tipping levers;
  (3) means for adjustably coupling together said upper and lower connector members to selectively grip and release said wheelchair tipping lever captured therebetween, said means including a plurality of coupling pins coupled to both said upper and lower connector members and a plurality of finger elements, each of said finger elements being pivotally coupled to one of said coupling pins by a set pin for reversibly actuating said adjustable coupling;

(b) electrical driving means coupled to said coupling assembly for automatically propelling said wheelchair, said electrical drive means including:
  (1) a holder assembly pivotally coupled to said coupling assembly, said holder assembly having first and second ends and a substantially hollow body portion extending therebetween;
  (2) at least a pair of drive wheels coupled to said first and second ends of said holder assembly body portion;
  (3) planetary gear means coupled to each said drive wheel; and
  (4) drive motor means housed within said body portion of said holder assembly and coupled to said planetary gear means for driving said drive wheels;

(c) a power source housed within said coupling assembly main body portion for energizing said drive motor means;

(d) means coupled to said coupling assembly and said electrical driving means for resiliently biasing said drive wheels towards said support surface; and, (e) control means coupled to said electrical driving means for the selective actuation thereof, said control means including a control column securable to an armrest of said wheelchair and a control circuit board for controlling said actuation of said electrical driving means responsive to manipulation of said control column.

* * * * *